(12) United States Patent
Khojastepour et al.

(10) Patent No.: US 7,715,863 B2
(45) Date of Patent: May 11, 2010

(54) THROUGHPUT MAXIMIZATION USING QUANTIZED RATE CONTROL IN MULTIPLE ANTENNA COMMUNICATION

(75) Inventors: Mohammad A. Khojastepour, Plainsboro, NJ (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 812 days.

(21) Appl. No.: 11/421,731

(22) Filed: Jun. 1, 2006

(65) Prior Publication Data

US 2006/0276217 A1 Dec. 7, 2006

Related U.S. Application Data

(60) Provisional application No. 60/686,358, filed on Jun. 1, 2005.

(51) Int. Cl.
*H04Q 7/32* (2006.01)

(52) U.S. Cl. .......................... 455/522; 455/68; 455/69; 455/500; 455/517; 455/426.1; 370/328; 370/329; 370/342; 370/343

(58) Field of Classification Search ................. 455/522, 455/68, 69, 127.1, 550.1, 552.1, 553.1, 562.1, 455/422.1, 403, 500, 517, 426.1, 426.2; 370/328, 370/329, 342, 343
See application file for complete search history.

(56) References Cited

U.S. PATENT DOCUMENTS

| | | | |
|---|---|---|---|
| 7,221,956 B2 * | 5/2007 | Medvedev et al. .......... 455/522 |
| 2003/0185309 A1 * | 10/2003 | Pautler et al. ............... 375/257 |
| 2004/0224725 A1 * | 11/2004 | Kim et al. .................... 455/561 |
| 2004/0242162 A1 * | 12/2004 | Lau ............................ 455/69 |
| 2005/0032540 A1 * | 2/2005 | Lee et al. .................... 455/522 |
| 2005/0164645 A1 * | 7/2005 | Li et al. ....................... 455/69 |
| 2005/0245280 A1 * | 11/2005 | Liu et al. ..................... 455/522 |
| 2006/0217143 A1 * | 9/2006 | Baker et al. ................. 455/522 |

* cited by examiner

*Primary Examiner*—Keith T Ferguson
(74) *Attorney, Agent, or Firm*—Joseph J. Kolodka

(57) ABSTRACT

A feedback link between a receiver and a transmitter in a multiple antenna communication system is used to control the transmission rate and thereby improve system throughput performance.

7 Claims, 2 Drawing Sheets

THROUGHPUT MAXIMIZATION USING QUANTIZED RATE CONTROL IN MULTIPLE ANTENNA COMMUNICATION

This application claims the benefit of and is a nonprovisional of U.S. Provisional Application No. 60/686,358, entitled "THROUGHPUT MAXIMIZATION USING QUANTIZED RATE CONTROL IN MULTIPLE ANTENNA COMMUNICATION SYSTEM," filed Jun. 1, 2005, the contents of which are incorporated by reference herein.

BACKGROUND OF INVENTION

The invention relates generally to wireless communication systems and, more particularly, to rate control in multiple antenna communication systems.

It has been shown that wireless communication systems with multiple antennas can provide significant performance improvements and achievable data rates over single antenna systems, in particular in fading environments. The time varying nature of the channel quality in wireless environments (referred to as "fading") causes random fluctuations in the received power level and, as a result, can lower the probability of reliable decoding. The attempted transmission rate may exceed the instantaneous channel capacity, a phenomena know as outage. Much effort has been directed recently to minimizing the outage probability through various adaptive transmission schemes.

The performance gains provided by multiple antennas systems can be considerably higher if knowledge of the channel state information is available. Unfortunately, in practical systems, it is often only possible to obtain an estimate of the channel state information at the receiver. Moreover, the receiver is usually limited to using a feedback link with a very limited capacity (e.g., a few bits of feedback per block of transmission) when providing the channel state information to the transmitter.

SUMMARY OF INVENTION

A feedback link between a receiver and a transmitter in a multiple antenna communication system is used to control the transmission rate and thereby improve system throughput performance. An optimized quantized rate control design is disclosed which enables a receiver to determine a transmission rate from an optimized finite set of transmission rates based on an estimate of channel conditions. The receiver can then use a limited feedback link to communicate the selected transmission rate back to the transmitter, the selected transmission rate serving to optimize throughput of the system for a given average power. Equivalently, for a targeted throughput, power savings can be achieved through the use of the quantized rate control mechanism. In one embodiment, an adaptive gradient search technique can be utilized to efficiently find the optimal rate allocations. The disclosed rate control design is advantageously of low complexity and requires a very low-rate feedback link (as little as a few bits per block of transmission) to achieve potentially significant gains in system throughput.

These and other advantages of the invention will be apparent to those of ordinary skill in the art by reference to the following detailed description and the accompanying drawings.

BRIEF DESCRIPTION OF DRAWINGS

FIG. 2 shows the probability distribution function for a 2×2 MIMO system. Finite level rate control for one, two and three levels are depicted.

DETAILED DESCRIPTION

Figure 1:
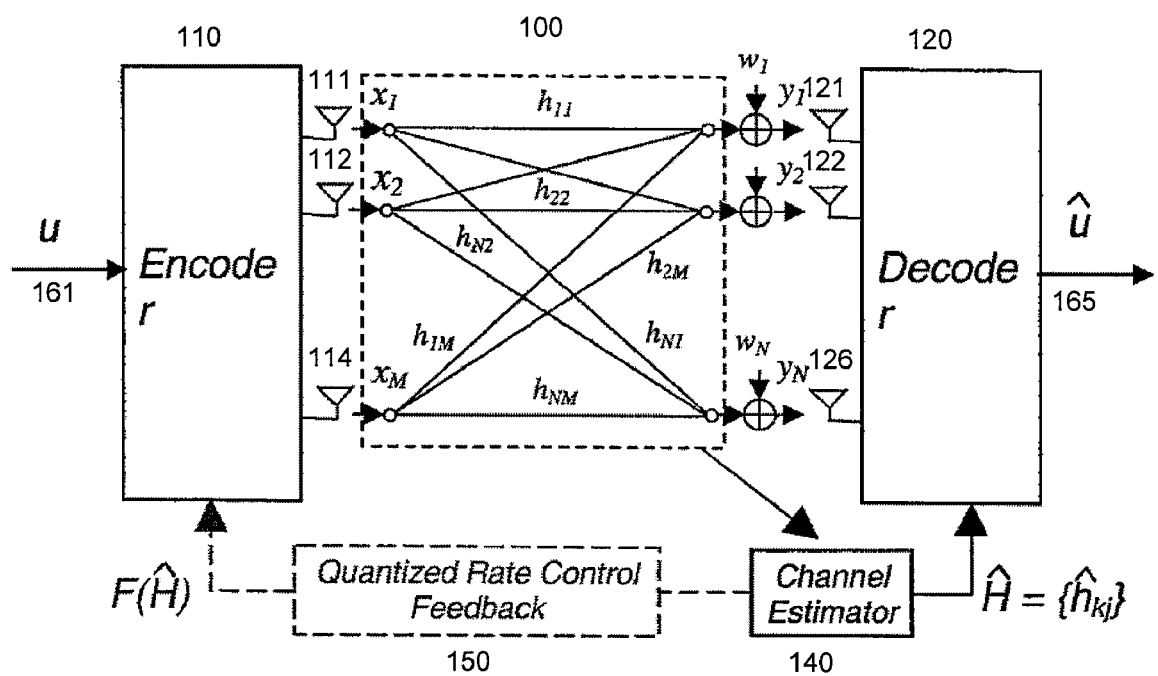
FIG. 1 illustrates a coded multiple-input multiple-output (MIMO) system, suitable for practice of an embodiment of the invention.

FIG. 1 is an abstract illustration of a coded multiple-input multiple-output (MIMO) system, suitable for practice of an embodiment of the invention.

As depicted in FIG. 1, the multiple antenna system has M transmit antennas 111, 112, . . . 114 and N receive antennas 121, 122, . . . 126 which communicate across a channel 100. It is assumed that the system utilizes some form of coding scheme with an encoder 110 at the transmitter that receives an input 161 and a corresponding decoder 120 at the receiver that produces an output 165, as shown in FIG. 1. The multiple antenna system can be modeled as follows: the received signal can be represented by a vector $Y_{N \times 1}$ such that $$y = Hx + w \tag{1}$$

where $x_{M \times 1}$ is a vector representing the transmitted symbols, $H_{N \times M}$ represents the channel matrix, and $W_{N \times 1}$ is a circularly symmetric complex additive white Gaussian noise with zero mean and variance one. Consider a block fading channel model in which the channel remains constant during transmission of each packet (or codeword of length T) and changes independently from one block to another block, where the distribution of the channel state is known a priori. The average power constraint on the transmissions can be expressed as $E[x^H x] \leq P$. Equivalently, since $tr(xx^H) = tr(x^H x)$ and the expectation and trace commute, this can be expressed as $E[x^H x] \leq P$. The channel model can be alternatively represented as $$Y_{N \times T} = H_{N \times M} X_{M \times T} + W_{N \times T} \tag{2}$$

where a codeword $X = (x_1 x_2 \ldots x_T)$ and the received vectors of $Y = (y_1 y_2 \ldots Y_T)$ are considered over the block length T in which the channel is constant. The power constraint can then be expressed as $Etr[X^H X] \leq PT$, where PT is the total average power constraint per transmission block of length T.

The channel matrix H can be adapted to represent a wide range of different cases of fading, e.g., the discussion below is applicable to an independent and identically distributed (i.i.d.) block fading channel model as well as a correlated fading model, rank deficient channels such as keyhole channel, and Rician fading in presence of line of sight. For illustration herein, we consider an (i.i.d.) Rayleigh channel model which means the elements of the channel matrix H are independent and identically distributed circularly symmetric complex Gaussian random variables with mean zero and variance one.

The multiple antennas system is assumed to have a channel estimator 140 and a quantized rate control feedback module 150 at the receiver. The receiver can utilize any of a number of known techniques for channel estimation at the channel estimator 140, e.g., preamble-based channel estimation, where there are MN unknowns that can be estimated with finite variance through transmission of a long enough preamble prior to transmission of the actual message. The value of MN unknown channel coefficients can be determined through MN independent measurements. Choosing a simple preamble of the form $$\sqrt{\frac{P_{pre}}{M}}\,I$$

would be then sufficient and the resulting mutual information of the channel through T (assume T>M is the coherence interval) uses of the channel is then lower bounded by $$I(x;y\mid H) \geq \frac{T-M}{T}\log\det\left(I + \frac{P_d}{M(1+\gamma_p^2 P_d)}\hat{H}\hat{H}^H\right), \quad (3)$$

where $$P_d = \frac{TP - P_{pre}}{T - M}$$

is the total average power used to transmit the actual data, P is the total available average power, and $P_{pre}$ is the power used in sending preamble to estimate the channel. It should be kept in mind that knowledge of the channel state at the transmitter has a finite variance (or error) in its estimation and is not perfect. Furthermore, this knowledge comes at the price of spending the power $P_{pre}$ and the time fraction $$I(x;y\mid H) \geq \frac{T-M}{T}\log\det\left(I + \frac{P_d}{M(1+\gamma_p^2 P_d)}\hat{H}\hat{H}^H\right), \quad (3)$$

where $$P_d = \frac{TP - P_{pre}}{T - M}$$

for training as part of the available system resources which is not used to send the actual data.

Assuming perfect or partial knowledge of the channel state information at the receiver, it can be sent to the transmitter via the feedback link. From a practical point of view, a small rate of feedback can be considered to be available from the destination to the source without wasting too much of the system resources. However, no matter how low the feedback rate is, because of the fading there is a probability of outage in receiving the crucial feedback information at the transmitter in which our design strategy depends. Therefore, it is important to incorporate the possibility of the outage (or lost in feedback information) in the design of finite rate feedback strategies.

The feedback link can be utilized herein for two different scenarios. First, the feedback can be used for power control while a constant transmission rate is used for all the blocks. However, we optimize the value of the attempted transmission rate. Second, the feedback link can be used for the case where the transmission power is fixed over each block, however, the transmission rate varies based on the channel state. At the receiver, the value of the transmission rate is chosen from a predetermined set of rates and then it is fed back to the transmitter.

The instantaneous mutual information of the channel for a block of transmission with the given channel state γ defines the maximum transmission rate that can be achieved with arbitrarily low probability of error in this block of transmission. For a given average power P(γ) per block, the supportable rate is given by $$C(\gamma) = \log\,\det\left(I + \frac{P(\gamma)}{M}\gamma\right) \quad (4)$$

where $\gamma = HH^H$ is the equivalent channel quality that includes the effect of the given space-time codes. For a given average power P, the cumulative probability density function of the supportable rate by the channel, $F_C(R)$, defined as $$F_C(R) \triangleq Prob\left(\log\,\det\left(I + \frac{P(\gamma)}{M}\gamma\right) < R\right) \quad (5)$$

which is equal to the probability of outage, $P_{out}(R, P)$, for a given rate R. It has been observed that the probability density function of the supportable rate by the channel, $$f_C(R) = \frac{\partial}{\partial R}F_C(R),$$

is asymptotically Gaussian distributed where either the number of the transmission antennas or the number of the received antennas go to infinity. Analytical expressions for the mean and variance of the distribution have been derived in the prior art in three cases:
 (i) when the number of transmit antennas grows large and the number of receive antennas remains fixed,
 (ii) when the number of receive antennas grows large and the number of transmit antennas remains fixed, and
 (iii) when both the number of transmit and the number of receive antennas grows large but their ratio remains, constant.

However, even for small number of transmit and receive antennas and the practical range of the average transmission power P it can be verified that the distribution is in fact very close to Gaussian distribution. In fact, for most practical purposes, including the quantized rate control design, it is enough to find the mean and variance of the distribution through simulation. For the rate control strategy herein, we can find the actual distribution of the channel through simulation. However, using the Gaussian approximation is beneficial in finding a closed form expression for the gradient, as discussed below. Having a closed form expression for the gradient is usually helpful for faster and smoother convergence of the below-described gradient based search optimization techniques. Still, we can find the actual mean and variance of the distribution through simulation without using any approximated formula to be used in the Gaussian approximation.

The optimal rate control strategy for a M×N multiple transmit antenna system with M transmit and N receive antennas in a block fading channel via finite number of bits of feedback may be derived as follows. The objective is to maximize total throughput of the system by choosing the attempted transmission rate from finite number of possible rate based on the estimate of the channel at the receiver. We assume perfect knowledge of the channel state information at the receiver, using Gaussian inputs assume that our coding scheme is capable of achieving the maximum instantaneous mutual information at each block, and finally, there is no error in the feedback link.

Consider a general model where H represents the equivalent channel model where the coding matrix is absorbed in the channel matrix. Therefore, it can be shown for an attempted transmission rate of R and average power $P_H(H)$ per block of transmission, the outage probability is given by $$P_{out}(R, P) = Prob\left(\log \det\left(I + \frac{P_H(\mathcal{H})}{M}\mathcal{H}\mathcal{H}^H\right) < R\right) \quad (6)$$

where H is the equivalent channel. The problem of outage minimization can then formulated as $$\min_{\mathcal{P}, P(\gamma) \in \mathcal{P}} Prob\left(\log \det\left(I + \frac{P(\gamma)}{M}\gamma\right) < R\right) \quad (7)$$

subject to $$\mathbb{E}_{[P(\gamma)]} \leq P \quad (8)$$

where P is the long term average power, $\gamma = HH^H$ is the effective channel quality, $\mathcal{P} \triangleq \{P_1, P_2, \ldots, P_L\}$ is a fixed power level codebook with L number of the power levels, and $P(\gamma)$ is a quantized power strategy which maps any points from the set of the effective channel qualities $\gamma \in \Gamma$ to a power level in P. When perfect knowledge of the channel state information is available at the transmitter, the power control strategy takes its value from a continuous set that can also be interpreted as $L \to \infty$. We denote optimal solution of the above outage probability minimization problem by $P_{out}^{(L)}(R, P)$, where L denotes the number of power levels that can be used by the transmitter. We artificially denote the minimum outage probability without channel state information at the transmitter by $P_{out}^{(1)}(R, P)$ because the transmission power is constant when the no channel state information is available at the transmitter. On the other hand, when we have perfect knowledge at the transmitter, the power level can take its value form a set of positive real numbers and we artificially denote the minimum outage probability with perfect channel state information at the transmitter by $P_{out}^{(\infty)}(R, P)$.

The throughput for a block fading channel is defined as the average rate of information transmission from the transmitter to the receiver with asymptotically zero error probability. Because of the possibility of the outage in block fading channels, the throughput is less than the attempted rate of transmission. For a constant attempted transmission rate R and long term average power P per packet and a given power control strategy with L bits of feedback the throughput T(R, P) is defined as $$T(R, P) = R(1 - P_{out}^{(L)}(R, P)) \quad (9)$$

Therefore, the throughput maximization problem with quantized power control can be formulated as $$\max_{R} \min_{\mathcal{P}, P(\gamma) \in \mathcal{P}} R\left(1 - Prob\left(\log \det\left(I + \frac{P(\gamma)}{M}\gamma\right) < R\right)\right) \quad (10)$$

subject to $$\mathbb{E}_{[P(\gamma)]} \leq P \quad (11)$$

The feedback can be used to provide some information about the channel state at the transmitter and improve a given performance metric. On the one hand, the feedback can be used to control the power at the transmitter to minimize the probability of the outage that also translates to minimizing the packet error. In this case, if maximizing the throughput is considered as the performance metric instead of minimizing the outage probability, the system throughput is then optimized by choosing the right value for the attempted rate of transmission R in (10). On the other hand, the feedback can be used to control the transmission rate per packet to maximize the throughput directly without any power control. The throughput maximization problem with quantized rate control can be formulated as $$\max_{\mathcal{R}, R(\gamma)} R(\gamma)\left(1 - Prob\left(\log \det\left(I + \frac{P}{M}\gamma\right) < R(\gamma)\right)\right) \quad (12)$$

The optimal rate control assumes the exact knowledge of $\gamma$, and choose the rate $$C(\gamma) = \log \det\left(I + \frac{P(\gamma)}{M}\gamma\right)$$

based on the channel state $\gamma = HH^H$. However, when the feedback has finite rate $\log_2(L)$ bits per block, the most efficient use of the feedback signal at the transmitter for rate control is to use a different transmission rate $R_i$ for each feedback signal $i \in \{1, 2, \ldots, L\}$. Therefore, for q bits of feedback, we need to find $L = 2^q - 1$ transmission rates $R_1, R_2, \ldots, R_L$ and a mapping function $$R(\gamma): \Gamma \to \mathcal{R} \quad (13)$$

where $\mathcal{R} = \{R_1, R_2, \ldots, R_L\}$ such that the total system throughput is maximized while the average power P is used in each block. Therefore, the set of $\Gamma$ is partitioned into L sets of $\Gamma_1, \Gamma_2, \ldots, \Gamma_L$ such that if for a block of transmission $\gamma \in \Gamma_i$ then the feedback signal i is sent to the transmitter and the associated transmission rate $P_i$ will be used in this block.

Without loss of generality, assume that the transmission rates satisfy $R_1 > R_2 > \ldots > R_L$ corresponding to the partition $\Gamma_1, \Gamma_2, \ldots, \Gamma_L$. It can be shown that the optimal solution to the quantized throughput maximization problem (12), avoids outage for all the channel conditions in the first L−1 partitions, and let the outage occur only in the last partition, $\Gamma_L$. Moreover, the partitioning of optimal solution is such that a channel condition $\gamma$ either belongs to (i) the partition $\Gamma_i$ with maximum index that can guarantee no outage for this channel quality, or (ii) this channel condition belongs to $G_L$. The structure of the optimal solution can be expressed more formally by the following results. Let $R(\gamma) \in \mathcal{R}$, $\mathcal{R} = \{R_1, R_2, \ldots, R_L\}$ be the optimal solution for the optimization problem (12), where $R_1 > R_2 > \ldots > R_L$. Then, for all $\gamma$ except in a set of measure zero the transmitted packet is not in outage and we have $$(1) R(\gamma) = R_1 \Leftrightarrow R_1 \leq C(\gamma) \quad (14)$$

$$(2) \forall i, 2 \leq i \leq L : R(\gamma) = R_i \Leftrightarrow R_i \leq C(\gamma) < R_{i-1} \quad (15)$$

otherwise, the transmitted packet is in outage and we have $$(3) R(\gamma) = R_L \Leftrightarrow 0 \leq C(\gamma) < R_L \quad (16)$$

The distribution of the supportable rate by the channel and the above results can be used to design the optimal rate control through quantized feedback. As discussed above, this distribution depends on the number of antennas both at the transmitter and the receiver, the used space-time codes (e.g. orthogonal designs, BLAST, or linear dispersion codes), and the average power of the code. Because in practice the distribution of supportable rate by the channel is a continuous distribution, we restrict our analysis to the cases where the density function is continuous and nonzero in the interval $(0, \infty)$. It is not hard to see that this condition is satisfied for the cases of Rician or Rayleigh fading channels using M×N multiple antenna systems. Based on these assumption, it is possible to prove the following simplified result. If the probability density function $f_C(R)$ of the supportable rate by the channel is continuous and positive in $(0, \infty)$, then the optimal L level quantized rate control function $R(\gamma)$ for (12) follows the form of equations (14)-(16).

Figure 2:
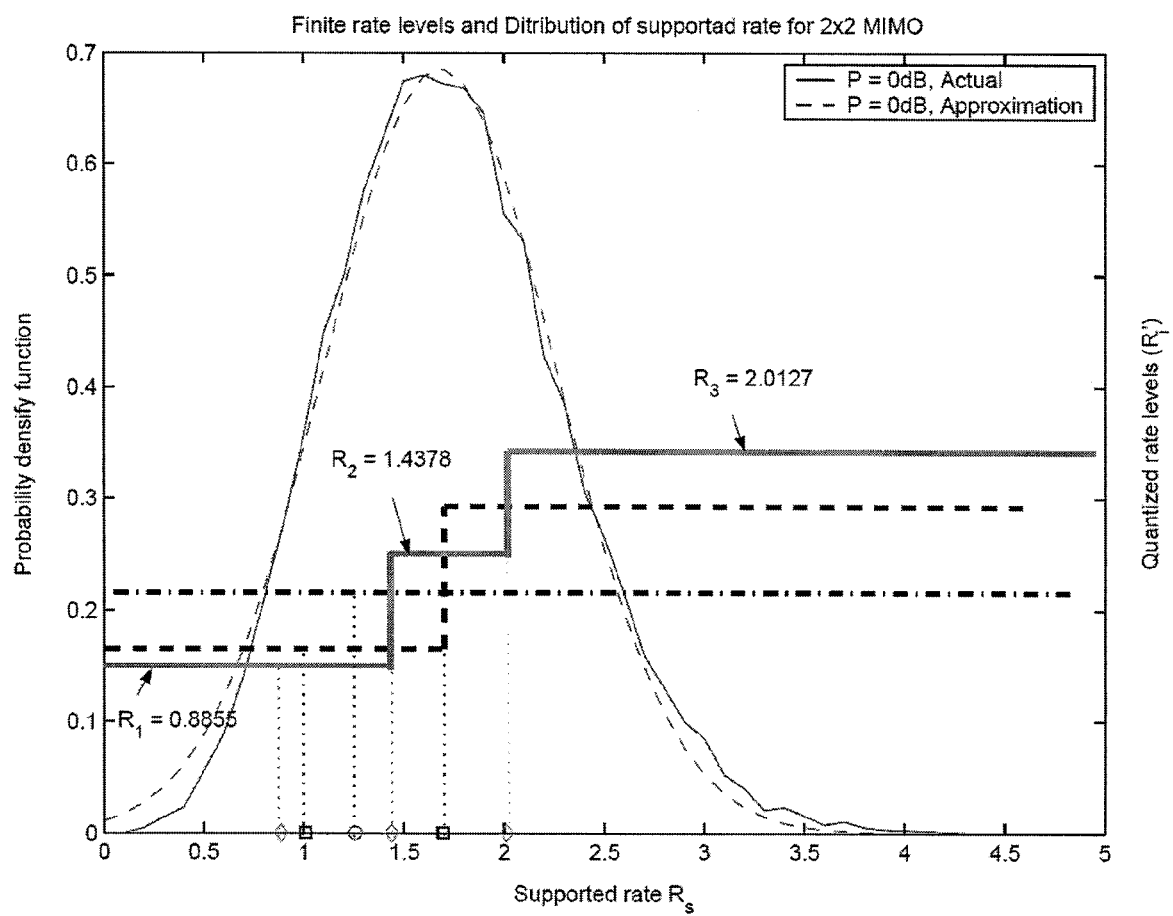
FIG. 2 is a graph representing a sample distribution of the supportable rate of the channel.

FIG. 2 shows an exemplary visualization of the distribution of the supportable rate by the channel and the optimal rate allocation strategy with L=1, 2, 3 levels of feedback that corresponds no feedback, one bit of feedback, and $\log_2(3)$ bits of feedback per block, respectively. Using the results above, we can see that the outage event occurs only in the interval $[0, R_L)$ and the corresponding outage probability is defined as $$P_{out}(R(\gamma), P) = \text{Prob}(R(\gamma) < R_L) = F_C(R_L) \quad (17)$$

The achievable average throughput of the system can also be written in terms of the rate levels $R_1, R_2, \ldots, R_L$ as $$T(R(\gamma), P) = \mathbb{E}[R(\gamma)] = R_L(F_C(R_{L-1}) - F_C(R_L)) + \ldots + R_2(F_C(R_1) - F_C(R_2)) + R_1(1 - F_C(R_1)) \quad (18)$$

Therefore, the optimization problem can be rewritten in the following form over the vector of the threshold values for the rate $\underline{R} = [R_1, R_2, \ldots, R_L]^T$ $$\max_{\underline{R}} R_L(F_C(R_{L-1}) - F_C(R_L)) + \ldots + R_2(F_C(R_1) - F_C(R_2)) + R_1(1 - F_C(R_1)) \quad (19)$$

Although the above maximization problem is not convex (or concave) optimization problem, the gradient search technique has shown to converge to a single vector of the rates irrespective of the starting point of the optimization problem. Therefore, we conjecture that the above optimization problem has a unique maximizer. For the case that L=1, we formally prove that although the objective is not concave, it has a unique maximizer. In fact, we can prove that the objective function is a log-concave function. The following result is proven in the APPENDIX. For the general multiple transmit and multiple receive antenna system and K-block channel fading model, there exist a unique maximizer for the throughput optimization problem with perfect channel state information at the receiver and no channel state information at the transmitter.

The stationary points of the above optimization problem (19) satisfy $\nabla_{\underline{R}} J = 0$, where $J = R_L(F_C(R_{L-1}) - F_C(R_L)) + \ldots + R_2(F_C(R_1) - F_C(R_2)) + R_1(1 - F_C(R_1))$. Therefore, we have $$\nabla_{\underline{R}} J = \begin{bmatrix} \frac{\partial \mathbb{E}[R(\gamma)]}{\partial R_1} \\ \frac{\partial \mathbb{E}[R(\gamma)]}{\partial R_2} \\ \vdots \\ \frac{\partial \mathbb{E}[R(\gamma)]}{\partial R_L} \end{bmatrix} \quad (20)$$

$$= \begin{bmatrix} -R_1 f_C(R_1) + (1 - F_C(R_1)) + R_2 f_C(R_1) \\ -R_2 f_C(R_2) + (F_C(R_1) - F_C(R_2)) + R_3 f_C(R_2) \\ \vdots \\ -R_L f_C(R_L) + (F_C(R_{L-1}) - F_C(R_L)) \end{bmatrix}$$

$$= 0$$

Note that the first (L-1) rows have similar form, but the last row is different. We can rewrite these set of nonlinear equations in the form $$(1 - F_C(R_1)) = (R_1 - R_2) f_C(R_1) \quad (21)$$

$$(F_C(R_1) - F_C(R_2)) = (R_2 - R_3) f_C(R_2) \quad (22)$$

$$\vdots$$

$$(F_C(R_{L-1}) - F_C(R_L)) = R_L f_C(R_L) \quad (23)$$

We can conclude from these last set of equations that if the number of rate levels goes to infinity, we have $$(R_i - R_{i+1}) f_C(R_i) \approx \int_{R_i}^{R_{i+1}} f_C(R) dR = F(R_i) - F(R_{i+1}) \quad (24)$$

and therefore the average throughput in each bins are asymptotically equal.

One advantageous technique for solving the throughput maximization problem (12) with quantized feedback and to find the optimal values of the rate control thresholds $R_1, R_2, \ldots, R_L$ is to use a gradient descent technique. The numerical techniques based on the gradient search rely on the fact that if the gradient of the objective function at the current solution point is not zero, by taking an step toward the opposite direction of the gradient, it is possible to find a new point for which the value of the objective function is smaller. However, in practice it is hard to know the right step size. The technique may not converge if the step size is large, and it may converge way too slowly if the step size is small. However, there are number of effective techniques to adjust the step size. The Barzilai-Borwein method is a steepest descent method for unconstrained optimization which has proved to be very effective for most practical applications. The Barzilai-Borwein gradient search method differs from the usual steepest descent method in the way that the step length is chosen and does not guarantee descent in the objective function. Combined with the technique of nonmonotone line search, such a method has found successful applications in unconstrained optimization, convex constrained optimization and stochastic optimization. A number of recent works have also developed and improved the Barzilai-Borwein gradient search method for some cases.

The adaptive gradient search algorithm is then defined with the following recursive equation for which the solution converges to a local extremum point of the optimization problem. However, our simulation results for multiple antenna systems over rayleigh fading channel shows that for any random starting point the solution converges to the same point. We have $$\underline{R}^{(k+1)} = \underline{R}^{(k)} - \mu_k \nabla_{\underline{R}} J \qquad (25)$$

where the gradient $\nabla_{\underline{R}} J$ is given by (20), and $\mu_k$ is the sequence step sizes. This sequence can be either chosen as an appropriate fixed sequence of decreasing positive real numbers such that $\Sigma_{k=1}^{\infty} \mu_k^2 < \infty$ and $\Sigma_{k=1}^{\infty} \mu_k \to \infty$, or it can be dynamically found through Barzilai-Borwein gradient search which improves the performance of the algorithm and usually converges faster. It should be pointed out that if the probability density function of the equivalent channel condition $\eta$ is analytically known, the value of the gradient can be found analytically. However, in many practical cases it is simpler to estimate the gradient by using its simplified form (20) through monte-carlo simulation. The gradient search stochastic optimization method is a very powerful technique where the actual gradient and value of the objective function is not known, but it can be well estimated through monte carlo simulation or evaluation of the system performance.

FIG. 2 shows the optimal quantized rate control levels with one, two, and three rate levels for a 2×2 multiple transmit and multiple receive antenna system. The probability density function of the supportable rate by the channel is also depicted to have a better representation of how those rates are chosen. The average throughput is then the sum of the area under the probability density curve times the transmission rate in each bin. The outage probability of the scheme is also represented by the area under the probability density curve in the first bin.

It should be pointed out that the Gaussian approximation discussed above is very useful to find the analytical expression for the gradient (20) in terms of the mean and variance. Therefore, the gradient can be well approximated with relatively small number of simulations.

In many practical communication system, the goal is to maximize the overall throughput that is the total sum of information packets that have been successfully decoded over a large period of time. Although minimizing the outage probability results in smaller frame error rates and increase in throughput, it is not sufficient for throughput maximization. In order to optimize the throughput, the transmission strategy should adapt the rate of the transmission with the channel variations. When the channel has a better quality, a higher rate should be used and when the channel suffers from a deep fading and has poor quality, the transmission rate should be lower to allow the packet to go through.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

APPENDIX

THEOREM: For the general multiple transmit and multiple receive antenna system and K-block channel fading model, there exist a unique maximizer for the throughput optimization problem with perfect channel state information at the receiver and no channel state information at the transmitter.

PROOF: We first note that the objective function is not a concave function. Figure ?? shows the throughput versus the attempted transmission rate R for a single transmit and single receive antenna as well as a 4×1 multiple antenna systems employing BLAST codes with the average power 1 dB per block. It is clear form the figure that the objective function is not convex or concave function of the attempted transmission rate R. However, the same figure suggest the existence of a unique maximum. We show that the objective function is a log-concave function and therefore the optimization problem has a unique maximum. For a K-block fading channel the optimization problem can be written as $$\max_R R\left(1 - Prob\left(\sum_{i=1}^{K} \log det\left(I + \frac{P}{M}\gamma_i\right) < R\right)\right) \qquad (26)$$

where $\gamma_i = H_i H_i^H$ is the equivalent channel quality for the $i^{th}$ block. By taking the logarithm of the objective function J(R), we have $$\log J(R) = \log R + \log Prob\left(\sum_{i=1}^{K} \log det\left(I + \frac{P}{M}\gamma_i\right) < R\right) \qquad (27)$$

For all $1 \leq i \leq K$, define the random variables $$C_i = \log det\left(I + \frac{P}{M}\gamma_i\right) \qquad (28)$$

and $$C = \sum_{i=1}^{K} C_i = \sum_{i=1}^{K} \log det\left(I + \frac{P}{M}\gamma_i\right). \qquad (29)$$

Therefore, we can rewrite the log J(R) as $$\log J(R) = \log R + \log Prob(C < R) = \log R + \log F_C(R) \qquad (30)$$

where $F_C(R)$ is the cumulative density function of C. To show that the objective function is log-concave we need to show that its logarithm is a concave function. Because log(R) is a concave function and the sum of two concave function is a concave function, it is enough to show that the cumulative density function of the channel $F_C(R)$ is a log-concave function.

Although the sum of log-concave functions is not necessarily log-concave, a very strong property of the log-concave function is that this property is preserved under integration for some cases, e.g., the convolution of two log-concave function is a log-concave function [?]. Therefore, because the random variable C is the sum of K random variables $C_i$, $0 \leq i \leq K$, its distribution is obtained through convolution and it will be log-concave if the distributions of $C_i$'s are log-concave. This latter property is usually easier to check. For example, the distribution of the channel quality for a M×1 or a 1×N multiple antenna system follows a chi-squared distribution. Therefore, the cumulative distribution function of $C_i$ can be written in term of the cumulative distribution of a chi-squared random variable and it can be readily verified through direct differentiation that this cumulative distribution function is a log-concave function.

Here, do not provide the direct analytical proof for the log-concavity of the cumulative density function of the instantaneous channel capacity for a general M×N multiple antenna systems over a single block fading channel. However, considering the Gaussian approximation of the instantaneous channel capacity of multi-antenna systems, and using the fact that the cumulative density function of a Gaussian distribution is log-concave, it is not hard to believe that $F_C(R)$ is log-concave.

What is claimed is:

1. A method for rate control in a multiple antenna communication system, the method comprising:
   estimating channel conditions between a receiver and a transmitter; and
   selecting one out of a plurality of optimized transmission rates for transmission using a feedback link back to the transmitter, with said selecting being performed based on the estimated channel conditions; and the plurality of transmission rates being optimized so as to maximize throughput of the system for a given average power;
   wherein an optimal transmission rate is selected using the following maximization of throughput:

$$\max_{R,R(\gamma)} \cdot R(\gamma)\left(1 - Prob\left(\log\ det\left(I + \frac{P}{M}\gamma\right) < R(\gamma)\right)\right),$$

where $\gamma$ is the channel state, R is the set of transmission rates, $R(\gamma)$ is a mapping from the set of effective channel qualities to the set of transmission rates, I is the mutual information of the channel, P is the total available average power, and M is the number of transmit antennae.

2. The method of claim 1 wherein the channel conditions are represented in the rate allocation by an equivalent one-dimensional channel condition.

3. The method of claim 1 wherein a pre-evaluation of the multiple-antenna communication system was performed based on the frame error probability of the system.

4. The method of claim 1, wherein an adaptive gradient search technique is utilized to efficiently find optimal rate allocation.

5. The method of claim 1, wherein the channel conditions are estimated using preamble-based channel estimation.

6. The method of claim 1, wherein the feedback link provides $\log_2(3)$ or fewer bits of feedback per block.

7. A receiver implementing rate control in a multiple antenna communication system, the receiver comprising:
   a channel estimator for estimating channel conditions between the receiver and a transmitter; and
   a feedback link selector which selects one out of a plurality of optimized transmission rates for transmission using a feedback link back to the transmitter, with said selection being based on the estimated channel conditions; and the plurality transmission rates being optimized so as to maximize throughput of the system for a given power range;
   wherein an optimal transmission rate is selected using the following maximization of throughput:

$$\max_{R,R(\gamma)} \cdot R(\gamma)\left(1 - Prob\left(\log\ det\left(I + \frac{P}{M}\gamma\right) < R(\gamma)\right)\right),$$

where $\gamma$ is the channel state, R is the set of transmission rates, $R(\gamma)$ is a mapping from the set of effective channel qualities to the set of transmission rates, I is the mutual information of the channel, P is the total available average power, and M is the number of transmit antennae.

* * * * *